(12) United States Patent
Ellsworth

(10) Patent No.: US 11,284,573 B2
(45) Date of Patent: Mar. 29, 2022

(54) MODULAR HYDROPONIC GROWING APPARATUS AND SYSTEM

(71) Applicant: Cecil Logan Ellsworth, Wasilla, AK (US)

(72) Inventor: Cecil Logan Ellsworth, Wasilla, AK (US)

( * ) Notice: Subject to any disclaimer, the term of this patent is extended or adjusted under 35 U.S.C. 154(b) by 339 days.

(21) Appl. No.: 16/504,880

(22) Filed: Jul. 8, 2019

(65) Prior Publication Data

US 2021/0007302 A1  Jan. 14, 2021

(51) Int. Cl.
*A01G 31/06* (2006.01)
*A01G 31/02* (2006.01)
*A01G 31/00* (2018.01)

(52) U.S. Cl.
CPC ............. *A01G 31/06* (2013.01); *A01G 31/02* (2013.01); *A01G 2031/006* (2013.01)

(58) Field of Classification Search
CPC ... A01G 31/02; A01G 31/06; A01G 2031/006
See application file for complete search history.

(56) References Cited

U.S. PATENT DOCUMENTS

| | | | | |
|---|---|---|---|---|
| 4,536,988 A | * | 8/1985 | Hogen | A01G 31/02 47/1.5 |
| 2006/0150485 A1 | * | 7/2006 | Somerville | A01G 17/14 47/47 |
| 2012/0324787 A1 | * | 12/2012 | Daas | A01G 9/047 47/65.8 |
| 2017/0027119 A1 | * | 2/2017 | Storey | A01G 31/02 |
| 2020/0352122 A1 | * | 11/2020 | Matera | A01G 31/06 |

* cited by examiner

*Primary Examiner* — Ryan A Reis
(74) *Attorney, Agent, or Firm* — David R. Conklin; Kirton McConkie

(57) ABSTRACT

The present invention provides various modular hydroponic growing apparatuses, each having oppositely positioned slats or other compatible surfaces between which is defined an expandable growth channel, wherein at least one of the slats or other compatible surfaces are biased inwardly towards the opposing slat or other compatible surface via a biasing element.

17 Claims, 4 Drawing Sheets

MODULAR HYDROPONIC GROWING APPARATUS AND SYSTEM

FIELD OF THE INVENTION

This invention relates generally to a hydroponic plant production apparatus greenhouse plant production. In particular, the present invention provides various modular hydroponic growing apparatuses, each having oppositely positioned slats or other compatible surfaces between which is defined an expandable growth channel, wherein at least one of the slates or other compatible surfaces are biased inwardly towards the opposing slat or other compatible surface via a biasing element.

BACKGROUND

Traditional hydroponics has focused primarily on horizontally oriented growing techniques and is limited by the inherent space constraints of that orientation. Vertically oriented hydroponic systems are known and widely used, but have the disadvantage of limited crop production due to inefficient and bulky square or round tubular designs, as well as restrictive growing media and other growing conditions required by these types of systems. For example, the constraints of these designs require an inefficient use of vertical and horizontal space, such that these systems are unable to take advantage of the variable space needs of crops at different life stages and sizes. Such vertical systems further require bulky growing media to fill tubes and support the growing plants. This media, whether organic or synthetic, has a short production lifespan as it quickly becomes clogged and contaminated, thereby requiring frequent replacement and disposal, as well as posing the risk of becoming a health hazard to the vegetation and the individuals maintaining these systems.

Therefore, there exists an unmet need for hydroponic apparatuses and systems which address and overcome at least some of the challenges set forth herein. The present invention provides such an apparatus and system.

BRIEF SUMMARY OF THE INVENTION

As illustrated in FIGS. 1-17, the present invention is a hydroponic L-shaped slat vertical plant growing apparatus, a second embodiment with a static core of spokes radiating outwardly from a central hub surrounded by L-shaped slats, and a third embodiment of a dynamic-slat apparatus with a static core surrounded by dynamic-slats allowing vertical hydroponic greenhouse crop production in a fraction of the space required by traditional horizontal growing techniques and improving significantly on prior art vertical hydroponic production designs. There are numerous distinct benefits of the hydroponic L-shaped slat vertical plant growing apparatus of the present invention and its various embodiments over other commercially available systems. The shared principal in these various embodiments is the dynamic expandability of oppositionally positioned L-shaped slats placed against each other, L-shaped slats placed against a spoked central hub, or dynamic-slats placed against a static central core. When a young plant is placed in a growth aperture of any of these embodiments, the combination of any of those dynamic surfaces against the static surfaces creates an interior growing space wherein fertigation solution may flow and plants roots may expand as a plant grows. The width of either face of the pair of slats can be varied depending on the intended plant variety(s) to be grown in the apparatus. The slats can be any length. In some instances, notches are formed into a face of each slat and vary in size and spacing according to the requirements of a plant variety being grown. In some instances, the notches comprise an open end that extends out through an edge of the slat. Each slat further comprises an inner face surface, wherein the pair of slats are arranged such that the inner face surface of each slat is positioned opposite to one another, wherein a space between the opposed inner face surfaces forms a growth channel along at least a portion of the length of the pair of slats. The growth channel comprises an adjustable width defined by a distance between the opposing inner face surfaces. The growing apparatus further comprises a biasing element that contacts an outer surface of at least one of the slats, wherein the biasing element biases at least one of the slats inwardly towards the opposing slat, such that the inner surface of at least one of the opposing slats is biased towards the inner surface of the opposing slat. In some instances, both opposing slats are biased inwardly towards one another via the biasing means.

In some instances, the growth channel further comprises at least one of a moisture/root barrier and a moisture wicking material. In some instances, a growth channel is divided into two or more sub-growth channels via a moisture barrier. In some instances, the hydroponic growing apparatus is suspended in a generally vertical orientation such that water may flow through a top opening of the growth channel and exit a lower opening of the growth channel via gravitational force. In some instances, the apparatuses and systems of the present invention can be used in multi-angled crop production and multi-storied conveyor-style crop production facilities and operations.

DETAILED DESCRIPTION OF THE PREFERRED EMBODIMENTS

The present invention provides various modular hydroponic growing apparatuses, each having oppositely positioned slats or other compatible surfaces between which is defined an expandable growth channel, wherein at least one of the slats or other compatible surfaces are biased inwardly towards the opposing slat or other compatible surface via a biasing element. In some embodiments, the present invention further provides multi-sided hydroponic growing apparatuses.

Figure 1:
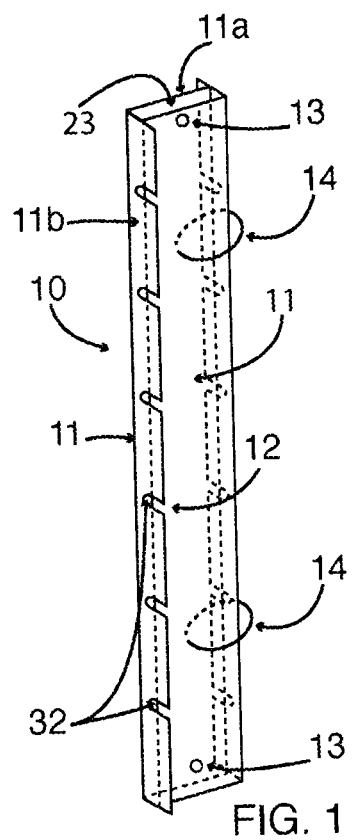
FIG. 1 depicts a front perspective view illustrating a pair L-shaped slats in an assembled configurations wherein the inner faces of the opposing slats provide a growth channel therebetween in accordance with a representative embodiment of the present invention.

Referring now to FIG. 1, an assembled hydroponic vertical plant growing apparatus 10 is shown. In some embodiments, apparatus 10 comprises a pair of L-shaped slats 11 which are positioned opposite to one another such that a growing channel 23 is defined by a space between the slats. In some embodiments, the L-shaped slats each comprise a long arm 11a and a short arm 11b, and are assembled such that the leading edge of each long arm 11a contacts or is placed in close proximity to the inner surface of the short arm 11b of the oppositely positioned L-shaped slat. Accordingly, growing channel 23 is more precisely defined by a constant width between the inner surfaces of the oppositely positioned inner surfaces of the short arms 11b, and the varying width between the inner surfaces of the opposing long arms 11a. Thus, the size or volume of growing channel 23 may vary as the positions of the L-shaped slats 11 are adjusted inwardly and outwardly relative to one another. In some embodiments, slats 11 comprise a material that is compatible for use in hydroponic growing environments and conditions. For example, in some embodiments slats 11 comprise a material that is non-corrosive, nonabsorbent, substantially rigid, and food-safe. Non-limiting examples of suitable materials for slats 11 include polyvinyl chloride, polycarbonate, polypropylene, stainless steel, and various composite materials, such as fiberglass and carbon fiber materials. In some embodiments, slats 11 comprise a flexible or semi-flexible material, such as a rubber polymer material capable of expanding or stretching in response to plant root development within growing channel 23.

The various components of hydroponic growing apparatus 10 may comprise any size compatible with an intended use. In some embodiments, long arm 11a is approximately 3.5 inches wide, and short arm 11b is approximately 1 inch wide. These dimensions may vary to accommodate a desired crop and/or crop density.

Growing apparatus 10 further comprises one or more biasing elements 14. In some embodiments, biasing element 14 is a spring fastener comprising a broken ring of resilient material, wherein the ends of the spring fastener are configured to contact the outer surfaces of each long arm 11a to bias the opposing slats 11 inwardly towards one another. Between the L-shaped slats 11 is the root growth space 23. In this embodiment both opposing vertical surfaces of the L-shaped slats are dynamic. When fastened together by the spring fastening clips 14, the apparatus 10 is light, portable, easily handled for loading and unloading, durable, reusable, and because the two halves come apart, they can be thoroughly sanitized after each grow cycle. Unlike other vertical hydroponic or aquaponic systems there is no growing media in the L-shaped slat hydroponic growing apparatus 10. Growing media has several potential disadvantages. It is an expense for the grower. It requires much more handling/time/effort. Because it encourages microbial growth, it dramatically increases the risk of contamination over systems that do not use media. Media can transfer plant diseases from one crop rotation to the next. The disposable wicking strip 24 of the hydroponic L-shaped slat vertical plant growing apparatus 10 of the present invention can be replaced or cleaned each time plants are harvested. There is no media to contaminate or be contaminated by.

Square or round tubes are difficult to clean and sanitize. In those tubes there are interior corners or edges that are difficult to reach or see. The hydroponic L-shaped slat vertical plant growing apparatus 10 of the present invention resolves that issue. When disassembled, both L-shaped slats 11, dynamic-slats 35, and multi-sided static surfaces 31 and 34, are fully exposed and can be completely accessed to be cleaned and sanitized.

Figure 2:
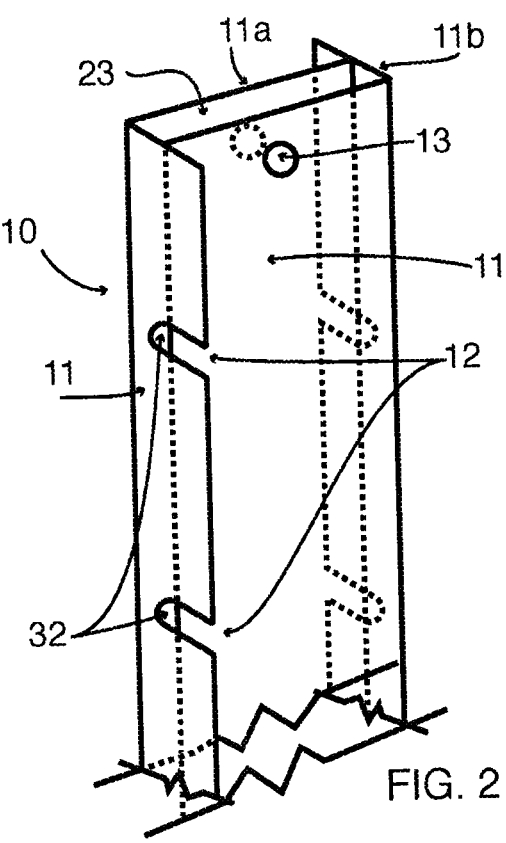
FIG. 2 depicts a detailed perspective view of the pair of L-shaped slats in FIG. 1.

FIG. 2 depicts a close-up front perspective view of the hydroponic L-shaped slat vertical plant growing apparatus 10 constructed in accordance with an exemplary embodiment of the present invention more clearly illustrating the plant growing aperture 32 created in the notches 12 when the two oppositionally positioned L-shaped slats 11 are brought together and the rearward edge of one L-shaped slat contacts the interior surface of the face of the oppositionally positioned L-shaped slat. The plant growing aperture 32 is created when plants are placed in the notches 12 or holes 13 with their roots extending into the growing space 23. These notches 12 or holes 13 can be placed in any position along an L-shaped slat or a dynamic-slat 35 depending on the type of crop being produced. The hydroponic L-shaped slat vertical plant growing apparatus 10 of the present invention is preferably constructed of a PVC material or other similar strong, flexible, food-safe material.

Figure 3:
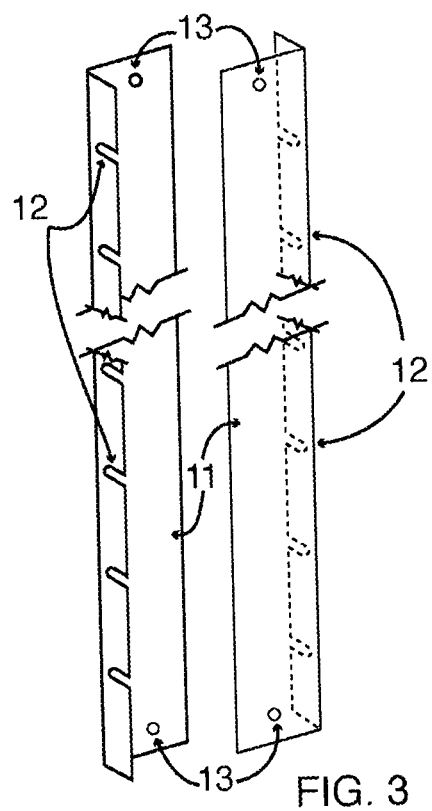
FIG. 3 depicts an exploded perspective view of the pair of L-shaped slats of FIG. 1.

FIG. 3 depicts a perspective view illustrating the two separated halves of the hydroponic L-shaped slat vertical plant growing apparatus 10 of FIG. 1 constructed in accordance with an exemplary embodiment of the present invention. This illustration shows an expanded view of the hydroponic L-shaped slat vertical plant growing apparatus 10 of FIG. 1 wherein a pair of oppositionally positioned L-shaped slats 11 are aligned in space to illustrate their ultimate positioning in relation to one another. It also illustrates that any of the embodiments of the apparatus 10, 30, or 39 may be manufactured in any length or width.

Figure 4:
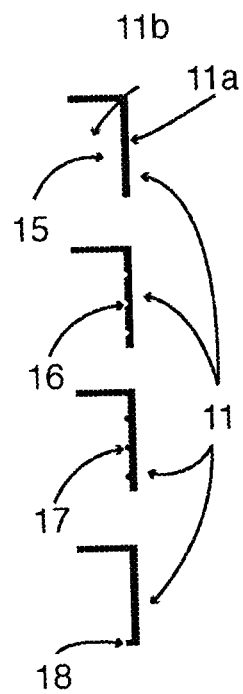
FIG. 4 depicts top views of various representative L-shaped slats having alternative inner surface configurations in accordance with various representative embodiments of the present invention.

FIG. 4 depicts a top view illustrating the L-shaped slats of FIG. 1 and some potential surface embodiments constructed in accordance with an exemplary embodiment of the present invention. Because plant anatomy varies widely and because time-to-harvest can be from 4 weeks to 30 weeks it is important to accommodate adequate fertigation profusion throughout the entire hydroponic L-shaped slat vertical plant growing apparatus 10. By creating interior surface grooves 16, ridges 17, or spacers 18, roots are less likely to fill all of the voids those irregularities create, thereby allowing sufficient nutrient flow and oxygenation to continue throughout the growth cycle. If necessary, a perforated tube 19 can run the entire length of the hydroponic L-shaped slat vertical plant growing apparatus 10 or any of its alternative embodiments 30 or 39.

Figure 5:
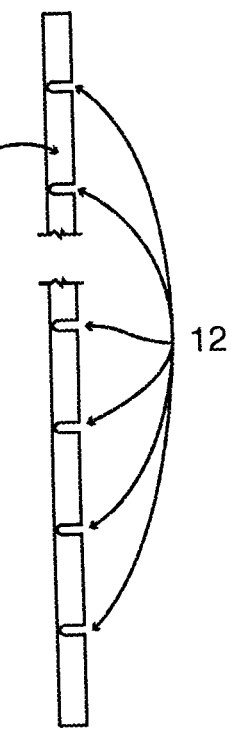
FIG. 5 depicts a front view illustrating the short arm of a L-shaped slat in accordance with a representative embodiment of the present invention.

FIG. 5 depicts a front view illustrating the hydroponic L-shaped slat vertical plant growing apparatus of FIG. 1 constructed in accordance with an exemplary embodiment of the present invention. While it is possible to place holes 13 or notches 12 on both faces of each L-shaped slat 11, notches will primarily be formed on the short face of the L-shaped slat 11b. These notches 12 are formed horizontally in the face of an L-shaped slat 11b and open outwardly through the edge of the short side of the face of the L-shaped slat 11b. The notches 12 or holes 13 may vary in diameter and length according to the crops being grown. FIG. 5 also illustrates that the L-shaped slat 11 may be manufactured in any desired length. It further illustrates that the notches 12 or holes 13 may be placed in the face of the L-shaped slat 11 at any interval, and that the notches 12 or holes 13 may vary in width and length in relation to the dimensions of the face of the L-shaped slat and the crop being produced.

Figure 6:
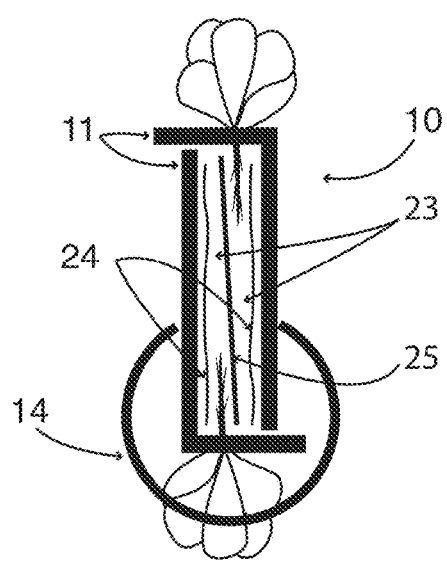
FIG. 6 depicts a top view of an assembled hydroponic growing apparatus of the present invention in accordance with a representative embodiment of the present invention.

FIG. 6 depicts a top view illustrating both halves of the hydroponic L-shaped slat vertical plant growing apparatus 10 of FIG. 1 being held in place by a circular spring biasing element 14 constructed in accordance with an exemplary embodiment of the present invention. This illustration shows the details of the root growth space 23 and the positioning of the wicking strips 24, and the plastic strip 25 in relation to the plant roots and the spring biasing element 14. It illustrates that the gap of the plant growth space 23 is dynamic and expands with the growth of the plant.

Figure 7:
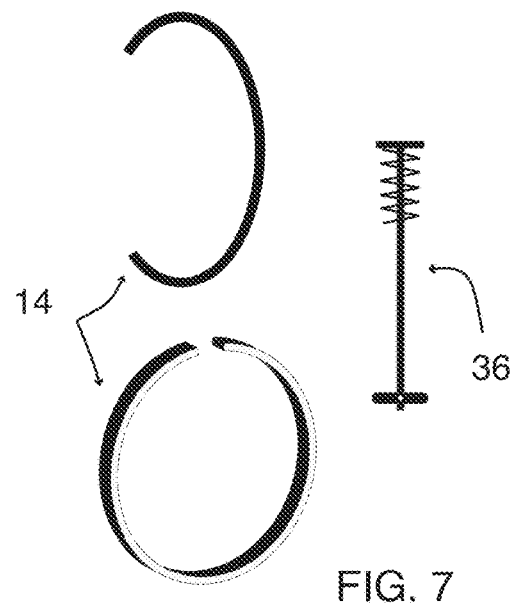
FIG. 7 depicts various types of biasing elements in accordance with various representative embodiments of the present invention.
Figure 14:
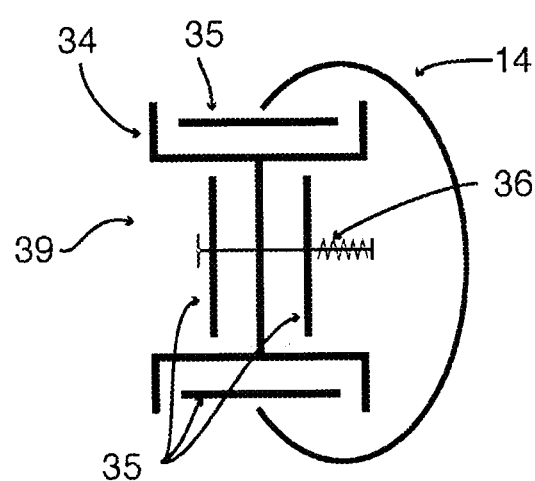
FIG. 14 depicts a top view of an assembled multi-sided hydroponic growing apparatus in accordance with a representative embodiment of the present invention.
Figure 17:
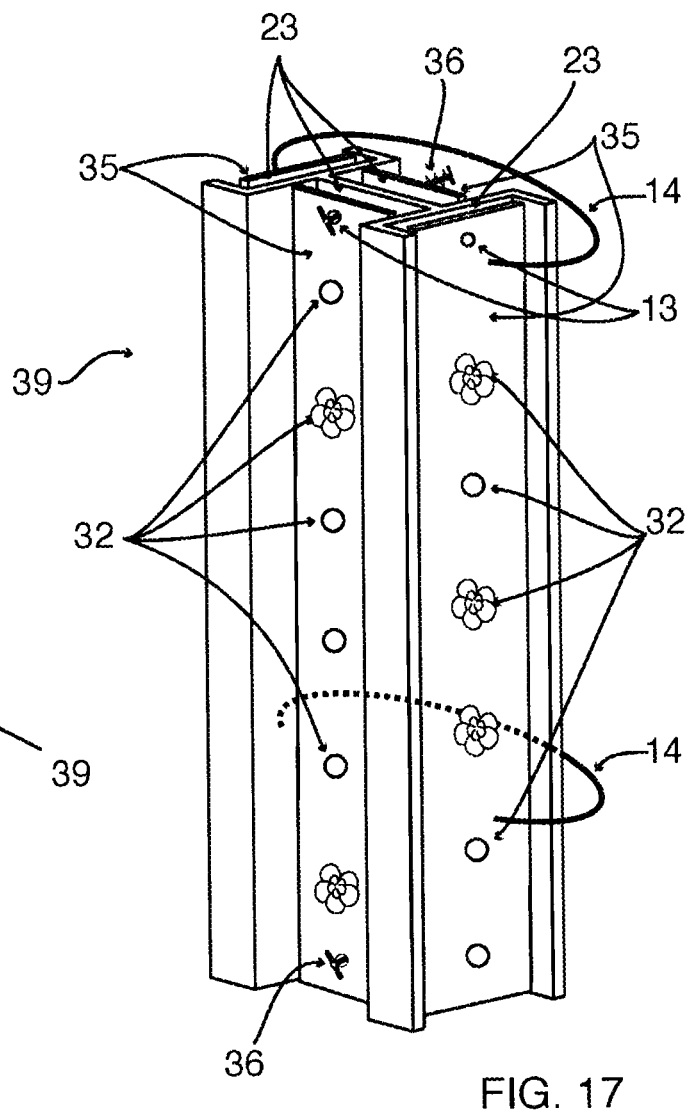
FIG. 17 depicts a perspective view of the assembled multi-sided hydroponic growing apparatus of FIG. 16 in accordance with a representative embodiment of the present invention.

FIG. 7 depicts an illustration of a circular spring biasing element used with the hydroponic L-shaped slat vertical plant growing apparatus of FIG. 1 constructed in accordance with an exemplary embodiment of the present invention. The spring biasing elements 14 of the hydroponic L-shaped slat vertical plant growing apparatus 10 of the present invention can be made of the same rigid PVC material as the L-shaped slats 11, or any other metal or similar clip that will squeeze the two L-shaped slats 11 together, but not so tightly as to constrict fluid movement or root growth. Spring f biasing element 14 must be strong enough to hold the slats 11 in place, be noncorrosive, easily sanitized, and durable. They will generally be circular or semicircular in order to fit around the front side of the slat 11. Swivel-headed spring pins 36 may also be used as biasing elements in place of circular spring biasing elements such as illustrated in FIG. 14 and FIG. 17. The swivel-head of a swivel-headed spring pin aligns parallel to the pin's shaft to pass through a hole 13 then is turned perpendicular to the shaft to hold the L-shaped slat 11 or dynamic-slat 35 against an opposing surface.

Figure 8:
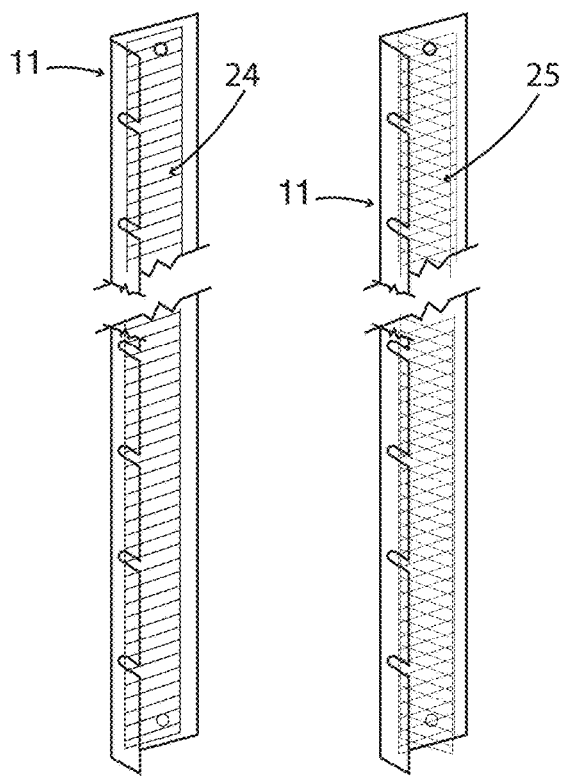
FIG. 8 depicts a perspective view illustrating the placement and relative size of a moisture wicking material and a moisture barrier in accordance with various representative embodiments of the present invention.

FIG. 8 depicts an exemplary perspective view illustrating the placement and relative size of the wicking strip 24 and plastic strip 25 as they are positioned within the root growth space 23.

Figure 9:
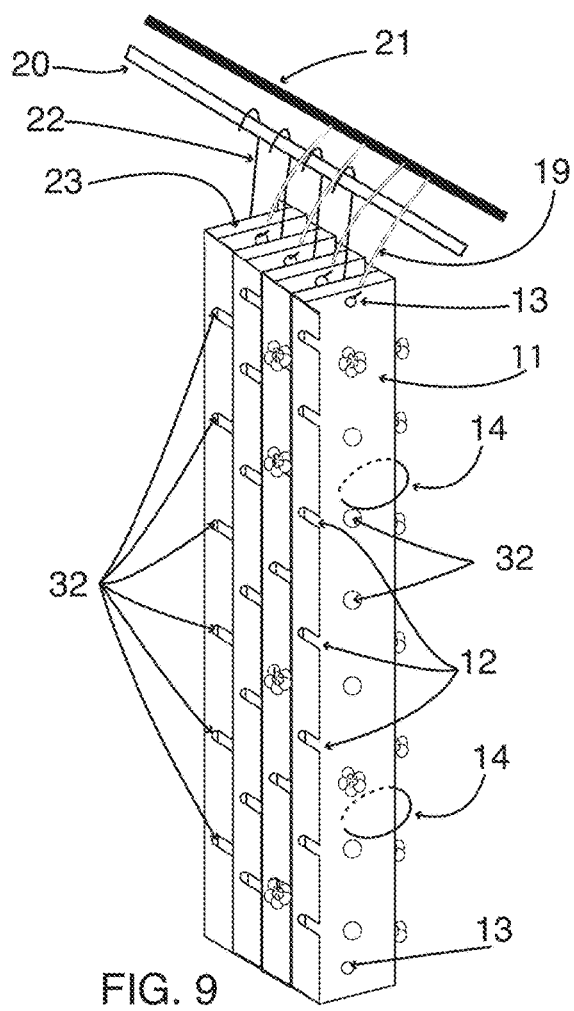
FIG. 9 depicts a perspective view illustrating an array configuration of a plurality of assembled L-shaped slats, wherein the pairs of slats are added to the array in a modular manner in accordance with a representative embodiment of the present invention.

FIG. 9 depicts a perspective view illustrating an exemplary potential array configuration of multiple hydroponic L-shaped slat vertical plant growing apparatus 10 of FIG. 1 constructed in accordance with an exemplary embodiment of the present invention.

The hydroponic L-shaped slat vertical plant growing apparatus 10 can be suspended vertically by a suspension device such as a pin, S-hook, clip, chain or other fastener 22 placed through the hole 13 at either end of the L-shaped slat 11, dynamic-slat 35, spoked static core 31, or another static core 34. Because the paired L-shaped slats 11, dynamic-slats 35, spoked static cores 31, or another static cores 34 parts mirror one another there is no top or bottom. The hydroponic L-shaped slat vertical plant growing apparatus 10 can be attached via its suspension device 22 to any horizontal bar, rod, track, automatic rotator or roller system 20 for easy placement, adjustment or removal.

Once suspended, the position of the hydroponic L-shaped slat vertical plant growing apparatus 10, dynamic-slat 35, spoked static core 31, or another static core 34 of the present invention can be adjusted manually, via an automated system or if the apparatus 10 has been suspended on a roller system the actual growth of the plants may push each separate apparatus 10 away from the one beside it, thereby self-adjusting its spacing. The apparatus 10 may be configured and used in automated, mobile or transportable modules.

To load or place plants into the hydroponic L-shaped slat vertical plant growing apparatus 10 of the present invention, one slat 11 will be placed horizontally on a table, notched 12 side up. A clean, wet fiber wicking strip 24, approximately the same width as the long side 11a of the L-shaped slat 11, will be placed along the length of the slat 11. The wicking strip 24 will keep roots moist between fertigation intervals. It will be held in place at the top of the slat 11 by the suspension device 22 or a separate biasing element. Seedlings will be laid on the wicking strip 24 with their roots toward the inside of the apparatus 10 and the leaves will extend through the notch 12. This area will become the root growing space 23 once the apparatus 10 is assembled. At this point, if both sides of the double-sided apparatus 10 are being planted, and depending on varietal plant root requirements, a thin moisture/root barrier 25 similar in size to the wicking strip may be laid down on top of the first row of roots. A row of plants facing the opposite direction is laid down on that plastic strip in the position of the notches 12 of the oppositionally positioned L-shaped slat 11. Another wet wicking strip 24 is laid along the length of the slat 11 over those roots. A second L-shaped slat 11, facing the opposite direction, with the notches 12 down, is placed down over the seedlings. Biasing elements 14 are placed around the body of the apparatus 10 to hold the two parts together and keep the seedlings in place. A hook or pin 22 is placed through the hole 13 and the wicking strips 24 and moisture/root barrier strip 25 (if one is being used). The apparatus 10 is then placed on the overhead weight bearing structure. The bottom of the device 10 can be left in a vertical axis or inclined to whatever angle is desired. To minimize sway, add stability or incline the array towards horizontal, a connecting rod or dowel could also be run though the holes 13 at the bottoms of an array of suspended hydroponic L-shaped slat vertical plant growing apparatus 10 of the present invention.

A length of fertigation tubing 21 is run along the top of an array of hydroponic L-shaped slat vertical plant growing apparatus 10 of the present invention which is suspended from a horizontal bar, rod, track or roller system 20. A secondary length of tubing 19, connected to the fertigation tubing 21 is inserted between the two slats 11 of the apparatus 10 into the root growing space 23. A pump and timer control the frequency and amount of nutrient solution pumped into the top of each apparatus 10. Gravity and capillary action circulate the nutrient solution to the bottom of the apparatus 10, passing it over the roots of the plants. The production process of the L-shaped slats 11 might also include modifications to the smooth inner surface 15 of the slats 11 to include such variations as grooves 16, ridges 17 or spacers 18 to facilitate better nutrient flow over the plant roots. Different root types may require unique surface modifications. Thin perforated tubing 19 could also be placed along the interior length of the apparatus 10 to insure nutrient solution reaches every plant. The bottom of each apparatus 10 can drain into any sort of gutter or tubing to flow via gravity or be pumped back to a nutrient tank to be recirculated.

Harvesting plants from the hydroponic L-shaped slat vertical plant growing apparatus 10 of the present invention is achieved by separating the suspension device 22 of the apparatus 10 from the overhead structure 20 and fertigation tubing 19, laying the apparatus 10 horizontally on a table, and removing the biasing elements 14 or 36. The top slat 11 is lifted away, plants are gathered for processing. The wicking strip 24 and moisture/root barrier 25 are cleaned or discarded. The L-shaped slats 11 and moisture/root barrier 25 are then sanitized and the process of planting is repeated.

While one of the potential benefits of vertical hydroponics is greater plant density per square meter of growing space, other vertical systems fall short of that potential because they are limited by large bulky square or round tubes, they can be clumsy to handle, planting media can potentially become contaminated, and the sheer bulk of the tubing limits narrower spacing options. For many weeks small plants require only inches of space, yet tubular towers and their racks consume feet of space and cannot take advantage of the weeks of potentially greater plant density available with young plants. The hydroponic L-shaped slat vertical plant growing apparatus 10 of the present invention can nest next to another hydroponic L-shaped slat vertical plant growing apparatus 10 within the width of the front face of the slat 11*b* for several weeks during the initial phases of plant growth. That means fewer lights are needed for fewer days per crop. That means a greater plant density per square meter of production. Additionally the hydroponic L-shaped slat vertical plant growing apparatus 10 of the present invention is multi-sided. It can produce plants on multiple faces of its structure, thereby potentially more than sextupling the capacity of single-sided four inch wide tubular structures on the same footprint, during the first weeks of crop production.

The hydroponic L-shaped slat vertical plant growing apparatus 10 of the present invention and its various embodiments 30 and 39 allow for a significant reduction of water usage over conventional agriculture and even improvements over other vertical hydroponic systems. Since the hydroponic L-shaped slat vertical plant growing apparatus 10 is multi-sided it can grow more plant material per gallon/per kilowatt expended on pumping and evaporation since fewer apparatus 10 are needed to produce a given number of plants.

The hydroponic L-shaped slat vertical plant growing apparatus 10 of the present invention and its various embodiments 30 and 39 can also be used with modular aquaponic systems.

Figure 10:
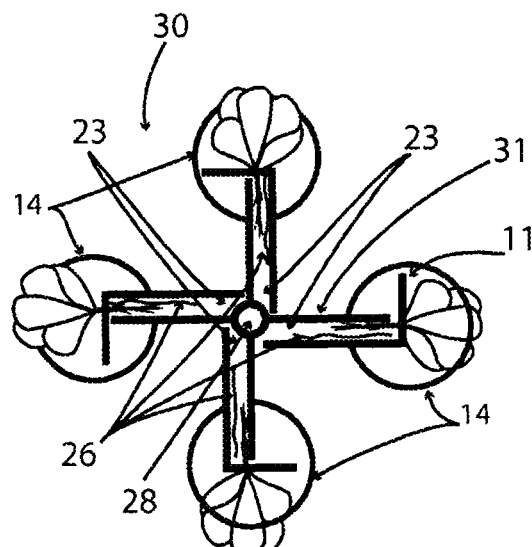
FIG. 10 depicts a top view of a hydroponic growing apparatus having a non-linear or multi-sided core for use with a plurality of L-shaped slats in accordance with a representative embodiment of the present invention.

FIG. 10 depicts an exemplary top view of a multi-sided iteration of the hydroponic L-shaped slat vertical plant growing apparatus 30 of FIG. 1 constructed in accordance with an exemplary embodiment of the present invention. It is possible to use L-shaped slats 11 around a multi-sided static central post 27 which may or may not have a hollow center core 28 through which nutrient solution might flow and reach the plant growth space 23 via small holes 29. A multi-sided static central post 27 could be configured with any number of sides, as spokes radiating out from the center hub 28. All L-shaped slat 11 configurations may be manufactured in any length and width. This alternative embodiment could be automatically rotated individually or as an array or module toward or around a light source on a predetermined schedule via mechanization, or manually adjusted.

Figure 11:
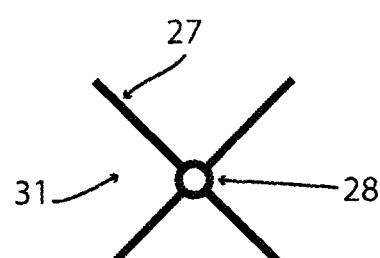
FIG. 11 depicts top view of the non-linear or multi-sided core section of FIG. 10.
Figure 12:
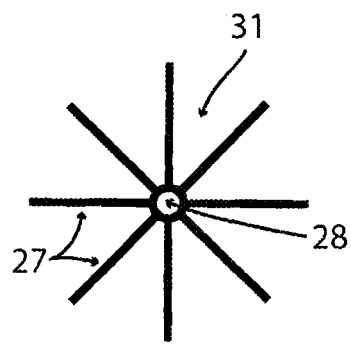
FIG. 12 depicts a top view of a non-linear or multi-sided core section of a hydroponic growing apparatus in accordance with a representative embodiment of the present invention.

FIG. 11 and FIG. 12 depict exemplary top views of a multi-sided iteration of the hydroponic L-shaped slat vertical plant growing apparatus 10 of FIG. 1 constructed in accordance with an exemplary embodiment of the present invention. The drawings illustrate that this embodiment 30 has a multi-sided central post 31 and may have any number of spokes 27. Each spoke 27 of the multi-sided central post 31 would pair with an L-shaped slat 11 and function as previously described.

It is also conceivable to create multi-sided embodiments of the L-shaped slat growing apparatus 30 and 39 of the present invention 10. It is possible to use L-shaped slats 11 around a multi-sided static central post 31 which may or may not have a hollow center core 28 through which nutrient solution might flow and reach the plant growth space 23 via small fertigation holes 29. A multi-sided static central post 31 could be configured with any number of sides/spokes 27 emanating out from a center hub 28. All L-shaped slat 11 configurations may be manufactured in any length and width. This alternative embodiment 30 could be automatically rotated toward a light source on a predetermined schedule via mechanization, or manually adjusted. Or a cluster of these suspended apparatus 30 could be rotated toward or around a central light source.

Figure 13:
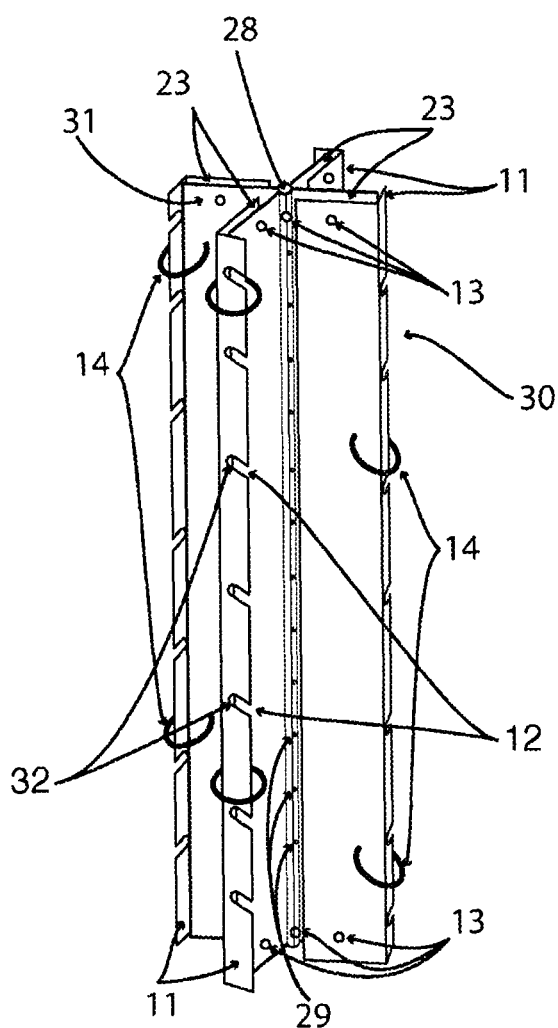
FIG. 13 depicts a perspective view of an assembled multi-sided hydroponic growing apparatus in accordance with a representative embodiment of the present invention.

FIG. 13 depicts an exemplary perspective view of a multi-sided iteration of the hydroponic L-shaped slat vertical plant growing apparatus 10 of FIG. 1 constructed in accordance with an exemplary embodiment of the present invention. This view illustrates how this embodiment of the L-shaped slat vertical plant growing apparatus 30 might appear if it were assembled and operating. Plant illustrations were omitted from the drawing to better clarify the structure of the multi-sided apparatus 30.

FIG. 14 depicts an exemplary top view of a multi-sided embodiment of the hydroponic L-shaped slat vertical plant growing apparatus 10 of FIG. 1 constructed in accordance with an exemplary embodiment of the present invention. This illustration depicts the positional relationship between a possible iteration of a multi-sided static core 34, the dynamic-slats 35, biasing elements of the swivel-headed pin fasteners 36, and the spring fasteners 14.

Figure 15:
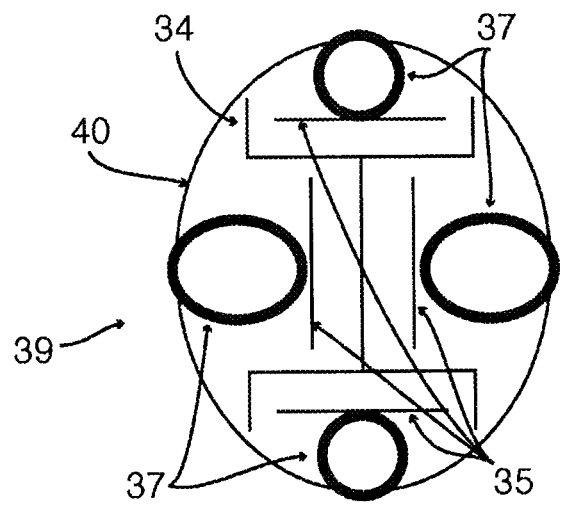
FIG. 15 depicts a top view of an assembled multi-sided hydroponic growing apparatus comprising a circular biasing element in accordance with a representative embodiment of the present invention.

FIG. 15 depicts an exemplary top view of a multi-sided iteration of the hydroponic L-shaped slat vertical plant growing apparatus 10 of FIG. 1 constructed in accordance with an exemplary embodiment of the present invention. This illustration depicts the positional relationship between a possible iteration of a multi-sided static core 34, the dynamic-slats 35, and a multiplicity of biasing elements such as elastic tighten bands or adjustable straps 40 being used in combination with or instead of swivel-headed pins 36 or spring fasteners 14. Since the size and shape of the static core 34 and the dynamic-slats 35 of the apparatus 39 may vary, proper positioning of the dynamic-slats 35 may be maintained by using a rubber band-like strap 40 to apply pressure equally against the biasing elements 37 inwardly and hold the biasing elements 37 in place against the dynamic-slats 35. These biasing elements 37 could be made of any suitable lightweight material such as segments of PVC tubing or wooden blocks. They could be hollow or solid.

Figure 16:
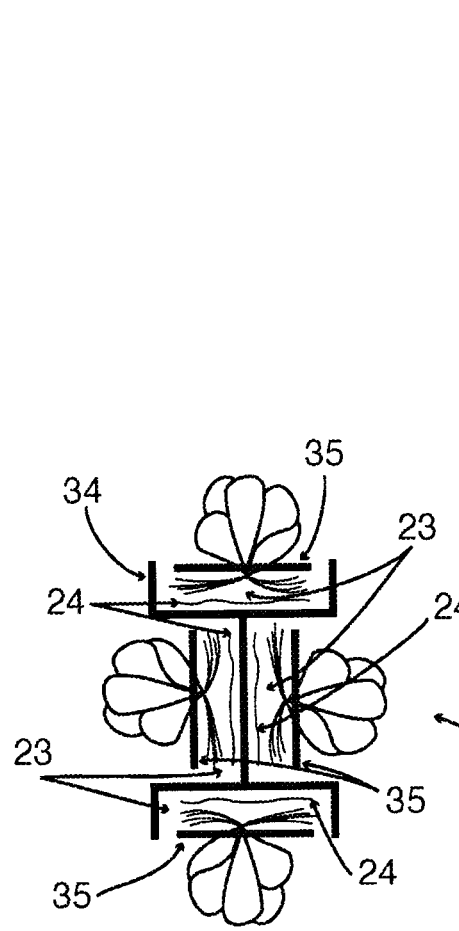
FIG. 16 depicts a top view of an assembled multi-sided hydroponic growing apparatus with moisture wicking material and shown with plants in accordance with a representative embodiment of the present invention.

FIG. 16 depicts an exemplary top view of a multi-sided iteration of the hydroponic L-shaped slat vertical plant growing apparatus 10 of FIG. 1 constructed in accordance with an exemplary embodiment of the present invention. This illustration depicts the positional relationship within the apparatus 39 between a possible iteration of a static core 34, the dynamic-slats 35, the wicking strips 24 and the plant growing spaces 23. It omits any fasteners from the illustration to more clearly depict how plants, the plant growing spaces 23 and the wicking strips 24 might appear in relation to one another.

FIG. 17 depicts an exemplary perspective view of a multi-sided iteration of the hydroponic L-shaped slat vertical plant growing apparatus 10 of FIG. 1 constructed in accordance with an exemplary embodiment of the present invention. It depicts what a multi-sided iteration 39 might look like if it was assembled and operating and the potential positioning of holes 13/growth apertures 32 in the dynamic-slats 35. The growth aperture 32 is created when plants are placed into the holes 13 and the dynamic-slat 35 is mated and held in place by pressure from a biasing element 14 or swivel-headed spring pin 36 to a static surface 34. In crop production each hole 13 may have a plant protruding from it. To illustrate this, a depiction of some plants has been included in some of the holes 13/plant apertures 32 to clearly illustrate how they would be positioned in production. Both swivel-headed spring pins 36 and circular fastener biasing elements 14 are depicted holding the dynamic-slats 35 against the static core 34. As with the L-shaped slat apparatus 10, and the multi-sided L-shaped slat apparatus 30, the multi-sided dynamic slat apparatus 39 may be manufactured in any size or length to be used in any stand alone, multi-storied, automated, manually adjusted or modular configuration.

The foregoing exemplary descriptions and the illustrative preferred embodiments of the present invention have been explained in the drawings and described in detail, with various modifications and alternative embodiments being taught. While the invention has been so shown, described and illustrated, it should be understood by those skilled in the art that equivalent changes in form and detail may be made therein without departing from the true spirit and scope of the present invention, and that the scope of the present invention is only to be limited to the claims except to be precluded by the prior art.

Moreover, the invention as disclosed herein, may be suitably practiced in the absence of the specific elements which are disclosed herein.

What is claimed is:

1. A hydroponic growing apparatus, comprising:
    a first slat having a first inner surface, a first outer surface, and a first length;
    a second slat having a second inner surface, a second outer surface, and a second length;
    a growth channel interposed between the first inner surface and the second inner surface; and
    a biasing element having a first contact surface adapted to contact the first outer surface, and a second contact surface adapted to contact the second outer surface, wherein when the first and second contact surfaces contact the first and second outer surfaces, respectively, the biasing element biases the first and second slats and, consequently, the first and second inner surfaces inwardly towards one another, wherein the first slat further comprises:
        a top end;
        a bottom end positioned opposite the top end;
        a leading edge extending between the top and bottom ends, the leading edge further comprising a growth aperture; and
        a trailing edge positioned opposite the leading edge and extending between the top and bottom ends,
    wherein the first slat is an L-shaped slat having a long arm and a short arm, said long arm being approximately 90° to the short arm, wherein said leading edge is on the short arm, and said trailing edge and said first inner surface is on the long arm, and
    wherein the second slat comprises a central core and a plurality of planar slats extending outwardly therefrom.

2. The apparatus of claim 1, wherein the growth channel extends substantially an entirety of the first and second lengths.

3. The apparatus of claim 1, wherein the first length is approximately equal to the second length.

4. The apparatus of claim 1, wherein the leading edge comprises a plurality of growth apertures.

5. The apparatus of claim 4, wherein each of the plurality of growth apertures comprises a depth extending inwardly from the leading edge and opening out through the leading edge.

6. The apparatus of claim 1, wherein the first and second slats are arranged such that the leading edge of the first slat is positioned opposite a trailing edge of the second slat, and the trailing edge of the first slat is positioned opposite a leading edge of the second slat, such that the growth aperture of the first slat is positioned opposite a grow aperture in the leading edge of the second slat.

7. The apparatus of claim 1, wherein the first and second slats are arranged such that the leading edge of each slat is in proximity to an inner surface of the short arm of the oppositely positioned slat, said long arms of each slat being approximately perpendicular to said short arms of the oppositely positioned slat, wherein the leading edge of each slat intersects the growth aperture of the oppositely positioned slat.

8. The apparatus of claim 1, wherein the first and second slats comprise a plurality of growth apertures.

9. The apparatus of claim 1, wherein the biasing element is C-shaped.

10. The apparatus of claim 1, further comprising a moisture barrier inserted within the growth channel to divide the growth channel into a first half defining a space between a first side of the moisture barrier and the first inner surface, and a second half defining a space between a second side of the moisture barrier and the second inner surface.

11. The apparatus of claim 10, wherein a growth aperture of the first slat is in communication with the first half of the growth channel, and a growth aperture of the second slat is in communication with the second half of the growth channel.

12. The apparatus of claim 10, further comprising a first wicking material positioned within the first half, and a second wicking material positioned within the second half.

13. The apparatus of claim 1, wherein each of the plurality of planar slats comprises a leading edge positioned opposite the central core, wherein the first and second slats are arranged such that the leading edge of the second slat is in proximity to an inner surface of the short arm of the first slat, the first inner surface of the long arm of the first slat being approximately parallel to the second inner surface of the second slat such that the first inner surface is positioned opposite the second inner surface, the growth channel positioned therebetween, wherein a position of the second is fixed, and wherein a position of the first slat relative to the second slat is dynamic.

14. The apparatus of claim 13, wherein the central core of the second slat comprises from four to eight planar slats.

15. A hydroponic growing apparatus, comprising:
- a plurality of first slats, each having an outer surface and an inner surface and each comprising a two dimensional planar shape;
- a second slat comprising an I-shaped slat having four C-shaped receptacles, each having an inner base surface and sidewall surfaces, and each C-shaped receptacle being adapted to receive one of the first slats;
- a growth channel interposed between the inner surfaces and the inner base surface of each C-shaped receptacle in which a first slat is positioned, wherein the positions of the inner base surfaces of the second slat are fixed, and wherein a position of the first slats relative to the inner base surfaces is dynamic, such that a width of the growth channel may be adjusted by moving the first slats relative to the fixed position of the inner base surfaces; and
- a biasing element having a plurality of contact surfaces adapted to contact the outer surfaces of the first slats, wherein the biasing element biases the first slats inwardly towards the inner base surfaces of the C-shaped receptacles in which a first slat is positioned, and consequently biases the inner surfaces of each of the first slats inwardly towards the relative inner base surfaces.

16. The apparatus of claim 15, wherein the biasing element comprises a band clamp.

17. The apparatus of claim 15, wherein the biasing element comprises a swivel headed spring clamp.

* * * * *